United States Patent
Kaup (10) Patent No.: US 6,452,970 B1
(45) Date of Patent: Sep. 17, 2002

(54) METHOD AND DEVICE FOR PROCESSING A DIGITIZED IMAGE

(75) Inventor: André Kaup, Höhenkirchen-Siegertsbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,485

(22) PCT Filed: Oct. 22, 1998

(86) PCT No.: PCT/DE98/03113
§ 371 (c)(1),
(2), (4) Date: Apr. 28, 2000

(87) PCT Pub. No.: WO99/22518
PCT Pub. Date: May 6, 1999

(30) Foreign Application Priority Data

Oct. 28, 1997 (DE) .......................................... 197 47 575

(51) Int. Cl.⁷ ................................................. H04N 7/12
(52) U.S. Cl. ................................ 375/240.1; 375/240.08
(58) Field of Search ....................... 375/240.03, 240.08, 375/240.1, 240.24, 240.26, 240.29; 348/425.1, 425.3, 420.1, 438.1, 393.1, 394.1, 395.1, 396.1, 397.1; 382/162, 164–166, 173, 236, 243

(56) References Cited

U.S. PATENT DOCUMENTS

| | | | | |
|---|---|---|---|---|
| 4,745,474 A | * | 5/1988 | Schiff | 348/419 |
| 4,933,762 A | * | 6/1990 | Guichard et al. | 348/388 |
| 5,055,927 A | * | 10/1991 | Keesen et al. | 348/389 |
| 5,150,432 A | * | 9/1992 | Ueno et al. | 382/250 |
| 5,196,933 A | * | 3/1993 | Henot | 348/419 |
| 5,260,808 A | * | 11/1993 | Fujii | 358/458 |
| 5,534,927 A | * | 7/1996 | Shishikui et al. | 348/400 |
| 5,644,406 A | * | 7/1997 | Harrington et al. | 358/433 |
| 5,974,172 A | * | 10/1999 | Chen | 382/166 |
| 6,141,433 A | * | 10/2000 | Moed et al. | 382/103 |
| 6,157,745 A | * | 10/2000 | Salembier | 382/236 |

FOREIGN PATENT DOCUMENTS

| | | | | |
|---|---|---|---|---|
| EP | 0 593 275 A1 | 4/1994 | | H04N/7/12 |
| EP | 0 635 981 A1 | 1/1995 | | H04N/7/14 |
| EP | 0 684 736 A2 | 11/1995 | | H04N/7/26 |
| EP | 0 720 385 A2 | 7/1996 | | H04N/7/36 |
| EP | 0 731 608 A2 | 9/1996 | | H04N/7/26 |
| EP | 0 785 689 A2 | 7/1997 | | H04N/7/50 |
| EP | 0 836 326 A2 | 4/1998 | | H04N/7/26 |
| EP | 0858053 | * 12/1998 | | G06T/9/00 |
| JP | 40627648 | * 9/1994 | | H04N/5/92 |

OTHER PUBLICATIONS

Huang et al, "Color image background segmentation and representation", ICIP '96, vol. 3, pp. 1027–1030 Sep. 1996.*
International Telecommunication Union, "Video coding for low bit rate communication", Series H: Audiovisual and Multimedia Systems Infrastructure of audiovisual services—Coding of moving video.
De Lameillieure et al., "MPEG–2–Bildcodierung für das digitale Fernsehen", Fernseh—und Kino–Technik.
Sikora, "Entwicklung eines MPEG–4 Video–Standards: Das MPEG–4 Video–Verfikationsmodell", Ferneh–unk Kino–Technik.

* cited by examiner

Primary Examiner—Vu Le (57) ABSTRACT

In the transmission of moving images in accordance with an MPEG, H.261, or H.263 standard, a region that satisfies a predetermined criterion of the image that is to be transmitted is coded with a higher image quality than the rest of the image. The region satisfies the criterion when it has a predetermined color, preferably a color similar to human skin. The higher image quality of the region that satisfies the criterion is guaranteed by a lower quantization value, a higher topical resolution, or a higher repetition rate.

18 Claims, 4 Drawing Sheets

METHOD AND DEVICE FOR PROCESSING A DIGITIZED IMAGE

BACKGROUND OF THE INVENTION

1. Field of the Invention

The invention relates to a method and a device for processing a digitized image.

2. Description of the Related Art

In the digital transmission of an image, particularly following image compression—that is to say, the reduction of image. data that are to be transmitted—the channel over which the transmission is accomplished is a bottleneck. The image data are transmitted over this channel from an (image) encoder to an (image) decoder. The bandwidth of this channel is mostly predetermined and constant, that the compression is correspondingly tailored to this bandwidth in the coder. According to the possibilities opened up by the standardized block-based image coding methods, for instance MPEG 4 or H.263 (see International Telecommunication Union, Telecommunications Sector of ITU, Draft ITU-T Recommendation H.263, Videocoding for low bitrate communication, May 2, 1996), the coder can be preset, or respectively, adapted, such that the number of images transmitted per unit of time is guaranteed, in exchange for which a loss of image quality is accepted.

One example is the videotelephone, which displays images that are transmitted over an ISDN B-channel with a transmission rate of 64 Kbit/s and that comprise a corresponding image quality: The images always produce an abrupt sequence having low resolution, and the images are displayed relatively small.

Block-based image coding methods (e.g. in accordance with MPEG or H.263 standards) are known from J. De Lameillieure, R. Schafer MPEG-2-Bildcodierng für das 'digitale Fernsehen', Fernseh-und Kino-Technik.

In image processing, the image quality is specified for a complete image that is to be transmitted. The image quality is modified depending on the available data rate, so that the bandwidth is exploited and the entire image can be transmitted. The disadvantage here is that a loss of quality must be accepted for the entire transmitted image.

SUMMARY OF THE INVENTION

It is the object of an invention to create a method and an arrangement for image processing whereby the above described disadvantage is avoided.

The object is achieved by a method for image processing, in which a digitized image is divided into two regions, whereby a first region satisfies a predetermined criterion, and a second region does not satisfy the predetermined criterion; in which the first region is processed with a higher image quality than the second region; in which the image quality is achieved in that the first region is quantized using a first quantization value, and the second region is quantized using a second quantization value, the first quantization value being less than the second quantization value; in which, when the criterion is satisfied, an optimally large contiguous region comprising several blocks that has the predetermined color (skin color) is guaranteed in that one of the following possibilities is realized: when a block does not satisfy the criterion, and this block is largely surrounded by additional blocks that do satisfy the criterion, this block is also coded with the first quantization value if the result of the comparison operation lies slightly over the predetermined threshold value; and when a block does not satisfy the criterion, and this block is situated amid blocks that do satisfy the criterion, then this block is also coded with the first quantization value.

The invention also provides an arrangement for image processing with a processor unit which is laid out such that a digitized image is divided into two regions, whereby a first region satisfies a predetermined criterion, and a second region does not satisfy the predetermined criterion; the first region is processed with a higher image quality than the second region; the image quality is achieved in that the first region is quantized using a first quantization value, and the second region is quantized using a second quantization value, the first quantization value being less than the second quantization value; in which, when the criterion is satisfied, an optimally large contiguous region comprising several blocks which has the predetermined color (skin color) is guaranteed in that one of the following possibilities is realized: when a block does not satisfy the criterion, and this block is largely surrounded by additional blocks that do satisfy the criterion, this block is also coded with the first quantization value if the result of the comparison operation lies slightly over the predetermined threshold value; and when a block does not satisfy the criterion, and this block is situated amid blocks that do satisfy the criterion, then this block is also coded with the first quantization value.

A method for image processing is designed by which a digitized image is divided into two regions: a first region which satisfies a predetermined criterion, and a second region which does not satisfy the predetermined criterion. The first region is then processed with a higher image quality.

An advantage of this is that a better image quality is achieved for the first region, which satisfies the predetermined criterion. The invention thus makes it possible to electronically process—that is, to transmit or compress—the first region as a part of the total image with a higher quality.

A development of the invention consists in dividing the image into several regions, whereby a number of first regions that satisfy the criterion are processed with a higher image quality than a number of second regions that do not satisfy the criterion.

This makes it possible to subdivide numerous regions within an image into several first and several second regions, and thus also to assign a higher image quality to noncontiguous regions of the same type as the first regions in the image.

A possible development of the invention is realized in that the criterion is satisfied when the first region of the image has a predetermined color. This can be a color similar to the color of human skin, for example.

A further development is realized in that the image is processed using a block-based image coding method. Examples of block-based image coding methods are methods that are defined in accordance with the MPEG or H.263 standards.

In a block-based coding method, for a block of the image of a predetermined size the color of the block is determined in the form of second color values, preferably by averaging the image points of this block. A comparison operation of the second color values to the first color values is performed. If a result of the comparison operation is less than a predetermined threshold value, the criterion is satisfied; that is, the block has a color that is at least similar to human skin. Otherwise (that is, the result of the comparison operation is not less than the predetermined threshold value), the criterion is not satisfied for this block.

A further development consists in carrying out the method iteratively for each block of the image.

The predetermined size of the block preferably amounts to 8×8 image points or 16×16 image points.

The comparison operation can be defined in different ways. Three possibilities are given below (see equations (1) to (3)):

$$|x_y-h_y|+|x_{Cr}-h_{Cr}|+|x_{Cb}-h_{Cb}|<S \qquad (1),$$

$$|x_y-h_y|^2+|x_{Cr}-h_{Cr}|^2+|x_{Cb}-h_{Cb}|^2<S \qquad (2),$$

$$k_1\cdot|D_1|+k_2\cdot|D_2|+k_3\cdot|D_3|<S, \qquad (3),$$

where $x_y$ references a luminance value (=brightness) of the first color values;

$x_{Cr}$ references a first chrominance value (=color tone) of the first color values;

$x_{Cb}$ references a second chrominance value (=color saturation) of the first color values;

$h_y$ references a luminance value (=brightness) of the second-color values;

$h_{Cr}$ references a first chrominance value (=color tone) of the second color values;

$h_{Cb}$ references a second chrominance value (=color saturation) of the second color values;

S references the predetermined threshold;

$k_1,k_2,k_3$ reference predeterminable weights;

$D_1$ references a first comparison of the luminance value of the first color values to a luminance value of the second color values;

$D_2$ references a second comparison of a first chrominance value of the first color values to a first chrominance value of the second color values;

$D_3$ references a third comparison of a second chrominance value of the first color values to a second chrominance value of the second color values.

It is particularly advantageous that the three quantities (luminance value, first chrominance value, second chrominance value) for an image point, or respectively, for an image block (correspondingly averaged from the image points of the image block), are compared to the predetermined threshold simultaneously. It is likewise conceivable to compare brightness, color tone, and color saturation for each block of the image, respectively, to a correspondingly predetermined value pertaining to skin color. In this case, one obtains three results of three comparison operations, which can be used to decide whether or not the criterion is satisfied. In other words, one obtains the results of individual comparisons $D_1$, $D_2$ and $D_3$. In the foregoing equations (1) to (3) the three individual comparison values are combined with one another and are collectively compared to the predetermined threshold value.

It is also possible to use a block-based image coding method in accordance with the MPEG 4 standard, whereby this standard makes it possible to make transmission modalities compatible for a defined region (what is known as an image object)—namely, one which preferably satisfies the predetermined criterion.

Another development is realized in that the higher image quality is achieved by specifying a higher image repetition rate for the first region. A selective image repetition rate for the first region (or several first regions in the digitized image, accordingly) that is higher than an image repetition rate for the (usually one) second region makes possible a more frequent updating of the first region, and thus a more fluid representation of movements. If a face is to be displayed, which represents a speaker, for example, the viewer sees the lip movements in continuous moving images, while the background, which does not correspond to the color of skin, is updated far less frequently, and so movements on this background are perceived only abruptly.

It is also possible to improve the image quality for the first region by increasing the topical resolution for this first region. A higher number of image points (pixels) compared to the second region guarantees a clearer rendering (higher resolution) of the first region.

A third possibility for improving the image quality is to influence the quantization values for both the first and second regions. The first region is quantized with a first quantization value; the second region, with a second quantization value. A higher image quality of the first region is guaranteed by the fact that the first quantization value is less than the second quantization value.

In the context of a further development, it is possible in accordance with the MPEG standard to switch over from the first quantization value (low value→high resolution→high demand for bandwidth) to the second quantization value (high value→low resolution→low demand for bandwidth), (the first quantization value being less than the second quantization value), in that a DQUANT symbol is transmitted with the second quantization value as a parameter; and conversely, it is possible to switch over from the second quantization value to the first quantization value in that the DQUANT symbol is transmitted with the first quantization value as the parameter.

It is also a development of the invention to guarantee an optimally large contiguous region as the first or second region, since this keeps down the number of changeover processes between the quantization values. As described above, each changeover process is preceded by a DQUANT symbol, by which an overhead is created, which is responsible for a loss of bandwidth that could otherwise be used for image information.

When, for example, several blocks of the image which satisfy the criterion are processed with the corresponding quantization value, an individual block situated between these several blocks that exceeds the predetermined threshold value should be quantized according to one of the equations (1) to (3) with a different quantization value than the image blocks that satisfy the criterion; the individual block, for which an extra quantization value would have to be newly declared, is thus also processed with the lower quantization value, like the blocks that satisfy the criterion.

One object is to minimize the changeover processes between quantization values that apply to consecutive blocks of the image. An individual block amid blocks that satisfy the criterion is advantageously also processed with the low quantization value and is thus transmitted with correspondingly high image quality, like the image blocks that surround it.

It is advantageous to establish in a preprocessing step prior to the actual quantizing process which blocks satisfy the criterion, which blocks in the vicinity of the blocks that satisfy the criterion do not satisfy the criterion, and which blocks of the image do not satisfy the criterion and are situated at a definite distance to the blocks that do satisfy the criterion. It is then possible, corresponding to the row-by-row processing of the image with the aid of a block-based coding method, to determine a favorable number and distribution of the changeover processes between the quantization values in that optimally large contiguous regions are acquired as blocks of the image that do or do not satisfy the criterion, respectively.

To this end, the threshold value S for a block can be controlled dependent on a number-of crossings of this threshold value in the neighboring blocks. The threshold value S is preferably lowered when many of the neighboring blocks comprise the predetermined color, and the threshold value S is raised when few of the neighboring blocks comprise the predetermined color.

It is noted that it is also possible to apply a combination of the aforesaid possibilities for improving image quality. For the most part, the desire for better image quality is subject only to physical framework conditions, such as an available maximum bandwidth. This is dependent only on the respective application and does not limit the combination of possibilities for improving the image quality, particularly of regions of a digitized image.

An advantage of the invention consists in specifying the image quality in an image that is to be transmitted such that the quality varies from location to location. It is highly advantageous to transmit portions of an image that are the color of skin with a higher quality than other parts of the image. An example of this is a telecommunication transmission in which the face and hands of the speaker are quantized and transmitted with a lower quantization value and thus in higher quality than the non-skin-colored region of the image. This also opens up the possibility for hearing impaired people to obtain information from the region of high image quality (skin-colored region), for instance by lip-reading or interpreting gestures. The videotelephone thus becomes a useful medium of communication for speech impaired or hearing impaired people, in particular, since hands as well as the face and (lips) are transmitted in higher quality than the rest of the image, and it becomes possible to communicate by means of lip and hand movements.

An arrangement for processing images is also inventively set forth, which arrangement has a processor unit that is configured such that the above described method can be carried out.

An arrangement for encoding a digital image is further set forth, which has means for carrying out a spectral transformation that transforms the digitized image into the spectral region. A means for entropy coding is also provided, which carries out a data reduction. Finally, the arrangement for coding has a buffer, which accepts data of varying rates from the means for entropy coding and forwards them to a channel which preferably has a fixed data rate.

A further development of the invention is realized in that an occupancy level of the buffer adjusts the quantization value to the device for quantization.

In another development, the device for quantization can be adapted in that a full buffer raises the quantization value and thus effectuates an unsharp transmission of the image, and an empty buffer reduces the quantization value, guaranteeing a higher image quality.

Developments of the invention are provided in which the image is divided into several regions, whereby a number of first regions that satisfy the criterion are processed with a higher image quality than a number of second regions that do not satisfy the criterion. Preferably, the criterion is that a region of the image has a color from a predetermined color domain. The color approximately corresponds to the color of human skin.

The present method is applicable in which the image is processed using a block-based image coding method. The block-based image coding method is defined in accordance with an MPEG standard or the H.261 or H.263 standards.

The image encoding provides that, for a block of the image, which is a specific size, the color of the block is determined in the form of second color values of the block; a comparison operation of the second color values to the first color values is performed; when a result of the comparison operation is less than a predetermined threshold value, the criterion is satisfied; that is, the block is at least similar to human skin; and, otherwise, the criterion is not satisfied for this block. In one embodiment, for each block of the image, the method is carried out iteratively. The predetermined size of the block is either eight pixels by eight pixels or 16 pixels by 16 pixels.

The comparison operation may be defined by:

$$|x_y-h_y|+|x_{CR}-h_{CR}|+|x_{Cb}-h_{Cb}|<S$$

where $x_y$ references a luminance value (=brightness) of the first color values;

$x_{Cr}$ references a first chrominance value (=color tone) of the first color values;

$x_{Cb}$ references a second chrominance value (=color saturation) of the first color values;

$h_y$ references a luminance value (=brightness) of the second color values;

$h_{Cr}$ references a first chrominance value (=color tone) of the second color values;

$h_{Cb}$ references a second chrominance value (=color saturation) of the second color values; and S references the predetermined threshold value.

Alternatively, the comparison operation is defined by:

$$|x_y-h_y|^2+|x_{Cr}-h_{Cr}|^2+|x_{Cb}-h_{Cb}|^2<S,$$

where $x_y$ references a luminance value (=brightness) of the first color values;

$x_{cr}$ references a first chrominance value (=color tone) of the first color values;

$x_{Cb}$ references a second chrominance value (=color saturation) of the first color values;

$h_y$ references a luminance value (=brightness) of the second color values;

$h_{Cr}$ references a first chrominance value (=color tone) of the second color values;

$h_{Cb}$ references a second chrominance value (=color saturation) of the second color values; and S references the predetermined threshold value.

The comparison operation may instead be defined by:

$$k_1\cdot|D_1|+k_2\cdot|D_2|+k_3\cdot|D_3|<S,$$

where $k_1,k_2,k_3$ reference predeterminable weights;

$D_1$ references a first comparison of the luminance value of the first color values to a luminance value of the second color values;

$D_2$ references a second comparison of a first chrominance value of the first color values to a first chrominance value of the second color values;

$D_3$ references a third comparison of a second chrominance value of the first color values to a second chrominance value of the second color values, S references the predetermined threshold value.

According to one development, the block-based image coding method is defined in accordance with the MPEG-4 standard, and the predetermined criterion is satisfied for a region that is definable in accordance with the MPEG-4 standard.

The higher image quality is achieved in that a higher image repetition rate is specified for the first region. The higher image quality is achieved in that a higher topical resolution is specified for the first region such that a higher number of pixels are processed for the first region. The changeover from the first quantization value to the second quantization value is accomplished in a preferred embodiment in that a DQUANT symbol is transferred with the second quantization value as a parameter, and conversely, the changeover from the second quantization value to the first quantization value is accomplished in that the DQUANT symbol is transferred with the first quantization value as the parameter.

BRIEF DESCRIPTION OF THE DRAWINGS

Exemplifying embodiments of the invention are described below with the aid of the drawings.

DETAILED DESCRIPTION OF THE PREFERRED EMBODIMENTS

Figure 1:
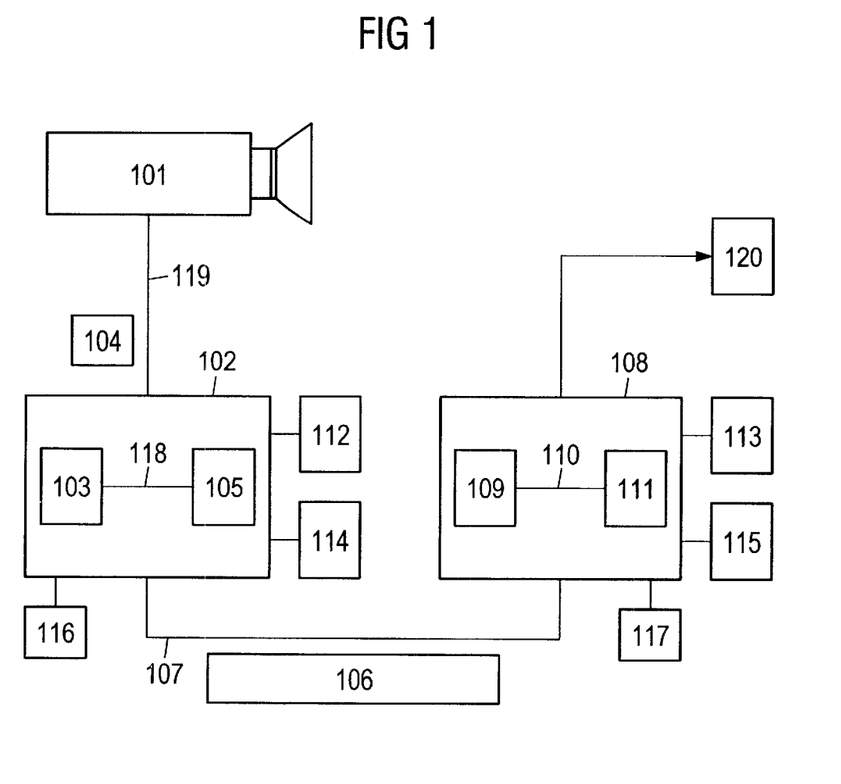
FIG. 1 is a functional block diagram of an arrangement of two computers, a camera, and a monitor, with which the coding, the transmission, and the decoding and rendering of the image data are accomplished.

FIG. 1 depicts an arrangement comprising two computers and a camera, whereby image coding, transmission of the image data, and image decoding are represented.

A camera 101 is connected to a first computer 102 via a line 119. The camera 101 transmits registered images 104 to the first computer 102. The first computer 102 has a first processor unit 103 at its disposal, which is connected to an image storage unit 105 via a bus 118. The methods for image coding are executed using the processor unit 103 of the first computer 102. Image data 106 that have been coded in this way are transferred from the first computer 102 to a second computer 108 via a communication connection 107, preferably a cable or a radio pathway. The second computer 108 contains a second processor unit 109, which is connected to the image storage unit 111 via a bus 110. On the second processor unit 109, methods for image decoding are executed.

The first computer 102 and the second computer 108 are each provided with a monitor 112 or 113, respectively, on which the image data 104 are visualized. Input units, preferably a keyboard 114 or 115 and a mouse 116 or 117, respectively, are provided for the purpose of operating the first computer 102 and the second computer 108.

The image data 104 that are transmitted by the camera 101 to the first computer 102 via the cable 119 are preferably data in the time domain, while the data 106 that are transferred from the first computer 102 to the second computer 108 via the communication connection 107 are image data in the spectral domain.

The decoded image data are displayed on a monitor 120.

The MPEG image coding process is will. now be briefly, explained. A longer explanation can be found in J. De Lameillieure, R. Schäfer: "MPEG-2-Bildcodierng für das 'digitale Fernsehen', Femseh-und Kino-Technik.

The coding method used in the MPEG standard is based essentially on the hybrid DCT (Discrete Cosine Transformation) with motion compensation. This method is used in a similar form for videotelephony with n×64 kBit/s (CCITT Recommendation H.261), for the TV contribution (CCR Recommendation 723) with 34 or 45 Mbit/s, respectively, and for multimedia applications with 1.2 Mbit/s (ISO MPEG 1). The hybrid DCT consists of a time processing stage, which exploits the affinity relations of consecutive images, and a topical processing stage, which exploits the correlation within an image.

The topical processing process (intraframe coding) corresponds essentially to classic DCT coding. The image is sliced into blocks of 8×8 pixels, which are respectively transformed into the frequency domain by DCT. The result is a matrix of 8×8coefficients that approximately reflect the two-dimensional topical frequencies in the transformed image block. The frequency of the AC coefficients rises along the $f_x$ and $f_y$ axes, while the DC coefficient (zero-frequency component) represents the mean gray value of the image block.

After the transformation, a data expansion takes place, because the amplitudes of the coefficients are preferably resolved with 12 bits, for reasons of computational accuracy. In any case, in natural master images energy will concentrate about the DC value (zero-frequency component), while the highest-frequency coefficients are usually zero. In a next step, the coefficients are weighted spectrally, reducing the amplitude precision of the high-frequency coefficients. Here, the properties of the human eye are applied, which is able to resolve high topical frequencies less precisely than low ones.

A second step of the data reduction occurs in the form of an adaptive quantization, by which the amplitude precision of the coefficients is further reduced, or respectively, the small amplitudes are set to zero. The scale of the quantization is dependent on the occupancy level of the output buffer: When the buffer is empty, a fine quantization occurs, whereby more data are generated; whereas, when the buffer is full, quantization is less exact, whereby the amount of data is reduced.

After the quantization, the block is scanned diagonally (zig-zag scanning); this is followed by an entropy coding process, which effectuates the actual data reduction. Two effects are exploited for this:

1) The statistical behavior of the amplitude values (high amplitude values occur less frequently than low values, so that long code words can be allocated to the infrequent events, and short code words can be allocated to the frequent events (variable length coding, or VLC). This results in a lower data rate results on average than in a coding using a fixed word length. The variable rate of VLC is subsequently smoothed in the buffer memory.
2) The fact is exploited that, from a definite value on, only zeroes follow in most cases. Instead of all these zeroes, only one EOB code (End Of Block) is transmitted, which leads to a significant coding gain in the compression of the image data. Instead of the output rate of 512 bits, only 46 bits are transferred for the block in this example, which corresponds to a compression factor of over 11.

An additional compression gain can be achieved by means of time processing (interframe coding). The data rate required to code difference images is lower than that required for the original images, since the amplitude values are far lower.

In any case, the time differences are small only when the movements in the image are slight. On the other hand, when the movements in the image are great, large differences arise, which are difficult to code. For this reason, the image-to-image movement is measured (movement estimation) and is compensated prior to the difference formation (movement compensation). The movement information is transferred with the image information, whereby only one motion vector is used per macroblock (for instance, four 8×8 image blocks).

Still smaller amplitude values of the difference images are obtained when a movement-compensated bidirectional prediction is used instead of the utilized prediction.

In a movement-compensated hybrid coder, the image signal itself is not transformed, but rather the time difference signal. For this reason, the coder also has a time recursion loop at its disposal, because the predictor must compute the prediction value from the values of the (coded) images already transmitted. An identical time recursion loop is located in the decoder, so that the coder and decoder are completely synchronized.

In the MPEG 2 coding method there are primarily three different methods with which images can be processed:

I images: For I images, no time prediction is used; that is, the image values are transformed and coded directly, as illustrated in picture 1. I images are used in order to be able to restart the decoding process without knowing the past, or respectively, to achieve a resynchronization given transmission errors.

P images: With the aid of P images, a time prediction is performed; the DCT is applied to the time prediction error.

B images: For B images, the chronological bidirectional prediction error is computed and subsequently transformed. The bidirectional prediction basically functions adaptively; that is, a forward prediction, a backward prediction, or an interpolation is permitted.

In MPEG 2 coding, an image is divided into what are known as GOPs (Group of Pictures). n images between two I images form a GOP. The spacing between the P images is referenced m; m−1 B images are situated between the P images, respectively. The MPEG syntax leaves it up to the user to determine how m and n are selected. m=1 means that no, B images are used, and n=1 means that only I images are coded.

Figure 2:
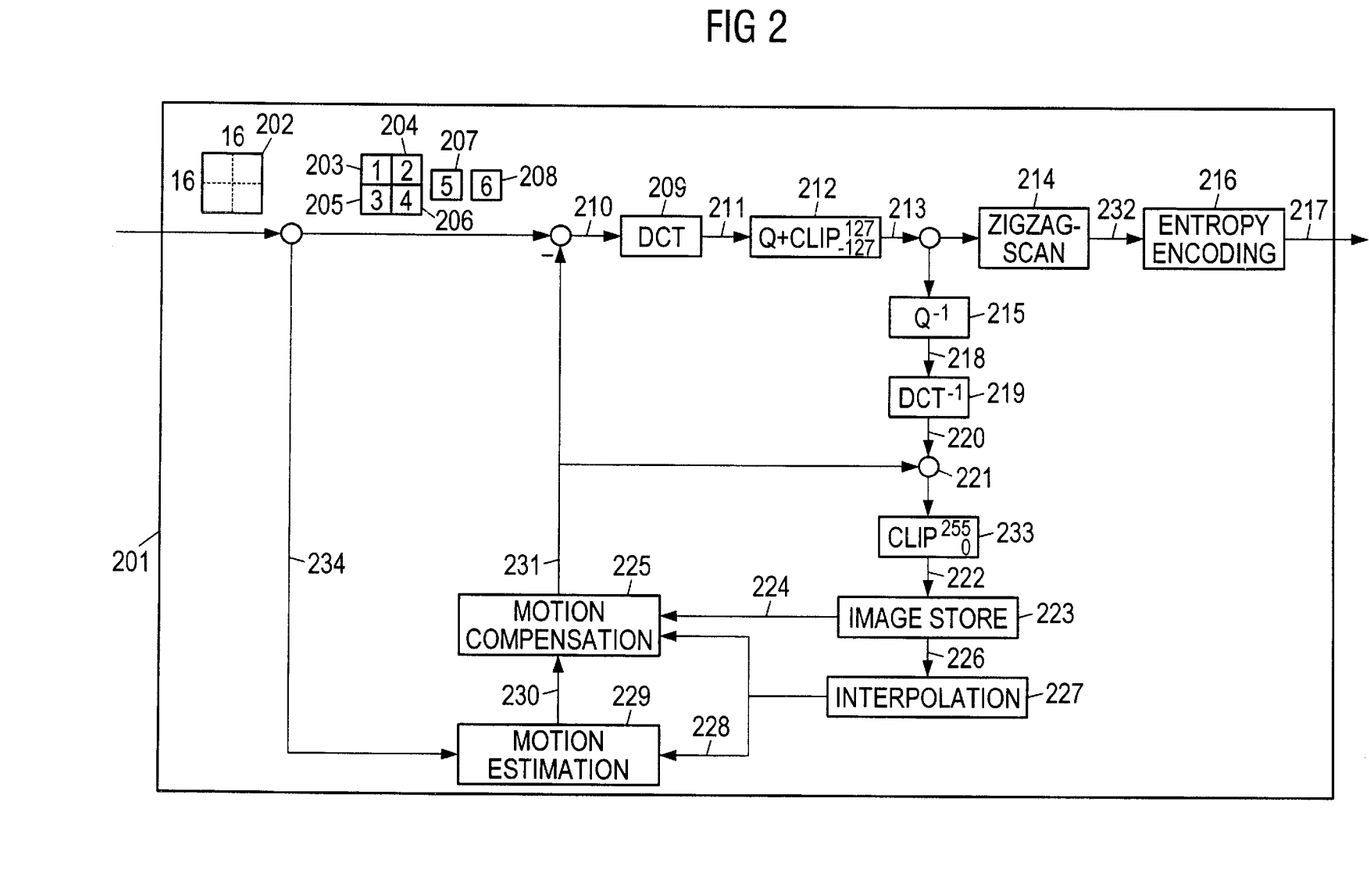
FIG. 2 is a diagram of a device for the block-based coding of a digital image.

FIG. 2 depicts a diagram of an arrangement for carrying out a block-based image coding method,in accordance with the H.263 standard (see. International Telecommunication Union, Telecommunications Sector of ITU, Draft ITU-T Recommendation H.263, Videocoding for low bitrate communication, May 2, 1996).

A video data current having time-consecutive digitized images that is to be coded is fed to an image coding unit 201. The digitized images are divided into macroblocks 202, whereby each macroblock has 16×16 pixels. The macroblock 202 has 4 image blocks 203, 204, 205, and 206, whereby each image block contains 8×8 pixels, to which luminance values (brightness values) are allocated. Each macroblock 202 further contains two chrominance blocks 207 and 208, with chrominance values (color information, color saturation) allocated to the pixels.

The block of an image contains a luminance value (=brightness), a first chrominance value (=color tone), and a second chrominance value (=color saturation). The luminance value, first chrominance value and second chrominance value are referred to here as color values.

The image blocks are fed to a transformation coding unit 209. In a difference image coding process, values that are to be coded of image blocks of chronologically preceding images are subtracted from the image blocks currently being coded; only the difference formation information 210 is fed to the transformation coding unit 209 (Discrete Cosine Transformation, DCT). To this end, the current macroblock 202 is communicated to a movement estimator 229 via a connection 234. In the transformation coding unit 209, spectral coefficients 211 are formed for the image blocks that are to be coded, or respectively, the difference image blocks, and these coefficients are delivered to a quantization unit 212. This quantization unit 212 corresponds to the inventive device for quantization.

Quantized spectral coefficients 213 are fed both to a scanning unit 214 and to an inverse quantization unit 215 in a reverse path. After a scanning process (for instance, a zig-zag scan), an entropy coding is carried out on the scanned spectral coefficients 232 in an entropy coding unit 216 that is provided for this purpose. The entropy-coded spectral coefficients are transferred to a decoder as coded image data 217 via a channel, preferably a cable or a radio pathway.

In the inverse quantization unit 215, an inverse quantization of the quantized spectral coefficients 213 is accomplished. Spectral coefficients 218 so obtained are fed to an inverse transformation coding unit 219 (inverse discrete cosine transformation, or IDCT). Reconstructed coding values (also difference coding values) 220 are fed in the difference, image mode to an adder 221. The adder 221 further receives coding values of an image block that derive from a chronologically preceding image in accordance with a movement compensation that has already been performed. With the adder 221, reconstructed image blocks 222 are formed and are stored in an image storage unit 223.

Chrominance values 224 of the reconstructed image blocks 222 are delivered from the image storage unit 223 to a movement compensation unit 225. For brightness values 226 an interpolation is accomplished in an interpolation unit 227 that is provided for this purpose. With the aid of the interpolation, the number of brightness values contained in the respective image block is preferably doubled. All brightness values 228 are fed to both the movement compensation unit 225 and the movement estimation unit 229. The movement estimation unit 229 additionally receives the image blocks of the macroblock (16×16 pixels) that is to be respectively coded via the connection 234. The movement estimation is accomplished in the movement estimation unit 229 in consideration of the interpolated brightness values ("movement estimation on a half-pixel basis"). In the movement estimation process, absolute differences of the individual brightness values in the macroblock 202 currently being coded and in the reconstructed macroblock are preferably obtained from the chronologically preceding image.

The result of the movement estimation is a motion vector 230, which expresses a local offset of the selected macroblock from the preceding image relative to the macroblock 202 being coded.

Both brightness information and chrominance information related to the macroblock that is computed by the movement estimation unit 229 comprise an offset equal to the motion vector 230 and are subtracted from the coding values of the macroblock 202 (see data path 231).

Figure 3:
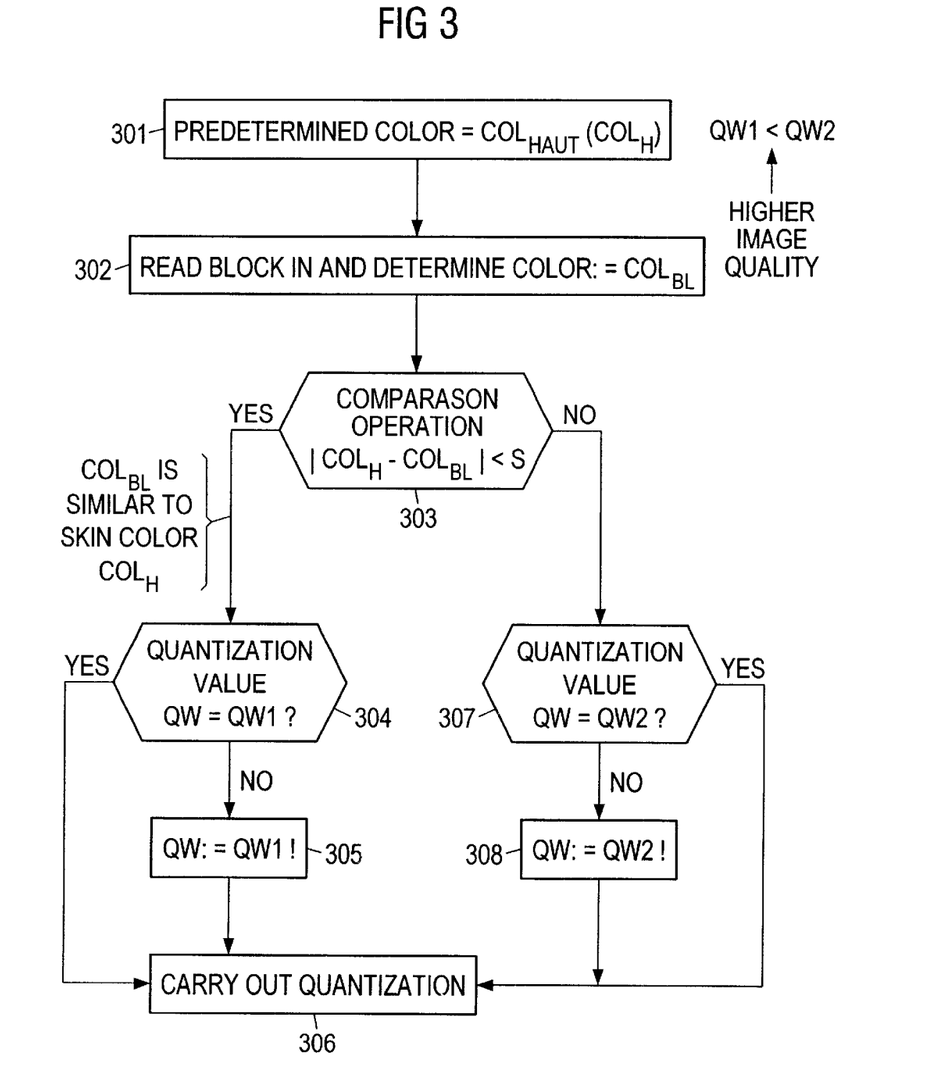
FIG. 3 is a flowchart showing step of a method for quantizing a digitized image by computer.

FIG. 3 depicts steps of a method for quantizing a digitized image using a computer. In a step 301, the skin color $COL_h$ is defined as the predetermined color (the criterion of the first region of the image). In a step 302, a block of the image is read in, and its color $COL_{BL}$ is determined. Since each individual pixel of the block has a brightness value, a color tone, and a color saturation, a corresponding mean value is formed for the entire block, which is summarized as color value $COL_{BL}$. In a step 303, a comparison operation is performed, which compares the color of the current block $COL_{BL}$ to the predetermined color $COL_H$ (skin color). This type of comparison operation is generally defined by:

$$|COL_H - COL_{BL}| < S \qquad (4)$$

As described above, color values stand for brightness, color tone and color saturation, which enter into the comparison operation as individual components of the color values. Three different comparison operations are cited below, though these are not meant to limit the invention:

$$|x_y - h_y| + |x_{Cr} - h_{Cr}| + |x_{Cb} - h_{Cb}| < S \qquad (1),$$

$$|x_y - h_y|^2 + |x_{Cr} - h_{Cr}|^2 + |x_{Cb} - h_{Cb}|^2 < S \qquad (1),$$

$$k_1 \cdot |D_1| + k_2 \cdot |D_2| + k_3 \cdot |D_3| < S, \qquad (3),$$

where $x_y$ references a luminance value (=brightness) of the first color values;

$x_{Cr}$ references a first chrominance value (=color tone) of the first color values;

$x_{Cb}$ references a second chrominance value (=color saturation) of the first color values;

$h_y$ references a luminance value (=brightness) of the second color values;

$h_{Cr}$ references a first chrominance value (=color tone) of the second color values;

$h_{Cb}$ references a second chrominance value (=color saturation) of the second color values;

S references the predetermined threshold;

$k_1, k_2, k_3$ reference predeterminable weights;

$D_1$ references a first comparison of the luminance value of the first color values to a luminance value of the second color values;

$D_2$ references a second comparison of a first chrominance value of the first color values to a first chrominance value of the second color values;

$D_3$ references a third comparison of a second chrominance value of the first color values to a second chrominance value of the second color values.

In step 303, the result of the comparison operation is compared to the threshold value S. If the difference of the predetermined color (skin color) $COL_H$ and the color of the block $COL_{BL}$ is less than the predetermined threshold value S, then the color of the block $COL_{BL}$ is at least similar to the skin color $COL_H$. In this case, in step 304 it is interrogated whether the instantaneous quantization value QW is equal to the first quantization value QW1. It should be noted that the first quantization value QW1 is less than the second quantization value QW2. The smaller a quantization value is, the higher the image quality that can be achieved by it. If, according to the interrogation in step 304, the quantization value QW is equal to the first quantization value QW1, then the quantization is carried out (see step 306). Otherwise, in a step 305 the first quantization value QW1 is set as quantization value QW, and then step 306, the quantization, is executed.

When the comparison operation 303 does not reveal any similarity of the color of the block $COL_{BL}$ to the skin color $COL_H$, an interrogation follows in step 307 as to whether the instantaneous quantization value QW is equal to the second quantization value QW2. If so, the quantization is performed (see step 306); otherwise, the second quantization value QW2 is set as the new quantization value QW in a step 308.

In the context of the abovementioned preprocessing, steps 304 and 307 are altered such that it is not only interrogated whether the quantization value QW must be modified as a result of the comparison operation from step 303, but rather to get an optimally large region of blocks that is; i.e., which is to be transmitted with one quantization value.

Figure 4:
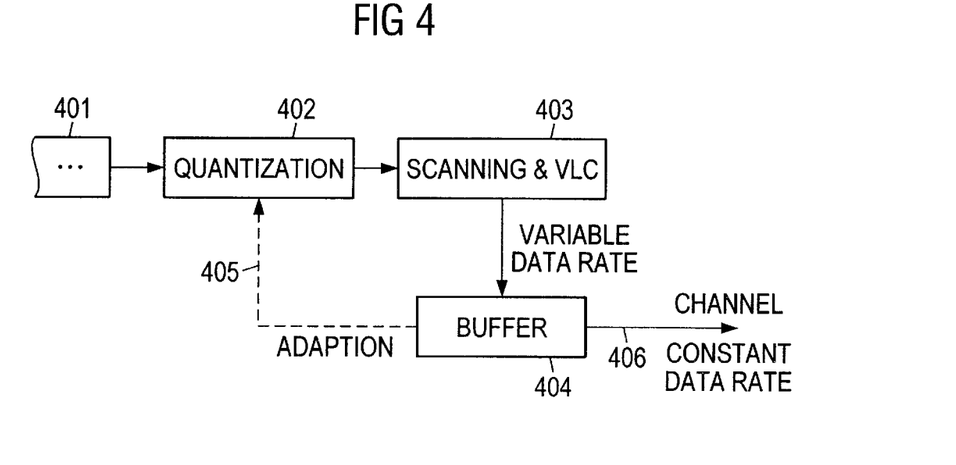
FIG. 4 is a diagram illustrating an adaptation of the quantizing dependent on a buffer status and, FIG. 5 is a diagram illustrating the options for increasing the image quality.

FIG. 4 depicts a diagram illustrating an arrangement of the quantization depending on a buffer status, A block 401 in FIG. 4 subsumes the first blocks of a block circuit diagram of a classic interframe coder. A digitized image is converted with the aid of a DCT into the frequency domain, where a weighting of the spectral coefficients occurs, which undergo a quantization in block 402. After the quantization, in a step 403 a scanning is performed with variable length coding, and the data thus obtained are written into a buffer 404. From the buffer 404, the compressed image data are transferred to a decoder via a channel 406.

Since the channel makes a constant-data rate available, but an image transmission should still at least approximately satisfy real time requirements, a definite time is available for each image that is to be transmitted. If the image coding does not occur in this time, the entire image is not transmitted. To guarantee that a whole image is always transmitted, the quantization 402 is adapted dependent on the occupancy level of the buffer.404 (see adaptation path 4-5). If it is established during the image coding that the remaining time is not sufficient for transmitting the whole image to the decoder, then the quantization is adapted in that the quantization value QW is raised. The result is an imprecise, unsharp image compression, but one which can be executed more-rapidly, accordingly, and which thus satisfies the real time requirements.

It is always guaranteed here-that the first region, which satisfies a criterion and which is to be transmitted with high quality, accordingly, nevertheless secures a higher image quality than the remaining second region. The quantization value for the first region is thus always smaller than that for the second region.

Figure 5:
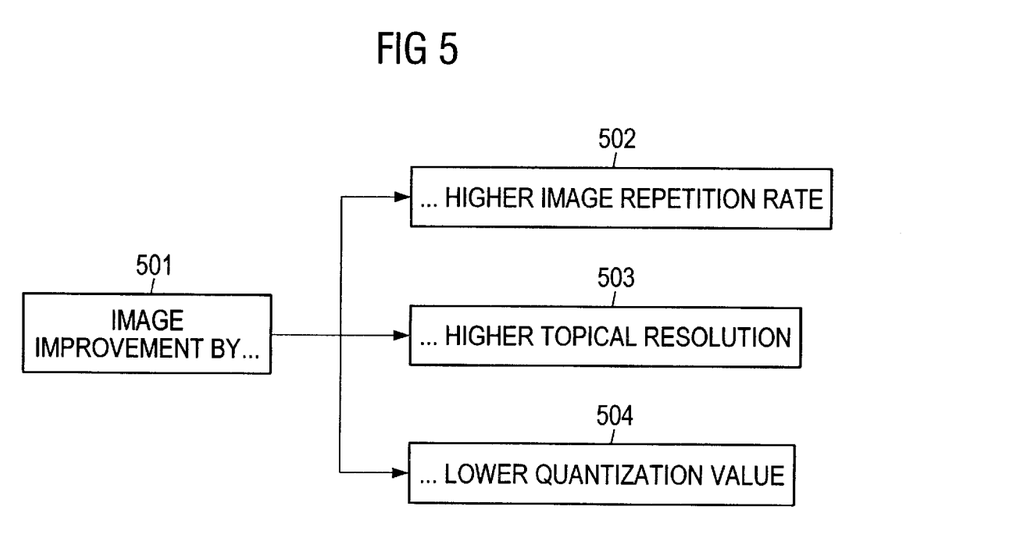

FIG. 5 depicts various options for improving (see block 501) the image quality.

In reference to the above described method, improving image quality relates in particular to the region provided for this purpose that has the predetermined color. Skin-colored surfaces of an image should be transmitted with a higher quality and should be displayed on a decoder with greater quality than the rest of the image.

A first option 502 is to increase of the image repetition rate (for the region with the predetermined color). Due to frequent updating of the corresponding region, this is rendered more fluidly than the rest of the moving image. Real time representation of the region is preferably guaranteed by corresponding settings in the image coding, so that a fluid movement of skin-colored surfaces is perceived on the part of the decoder.

A second option 503 is to increase the topical resolution. A higher image sharpness is achieved on the basis of several points per unit of surface area for the region that satisfies the predetermined criterion.

Finally, a third option 504 is to reduce the quantization value for the predetermined region (as described in detail above). On the basis of a quantization value that is reduced compared to the rest of the image, for the repeatedly mentioned region (which satisfies the predetermined criterion, or respectively, which is preferably skin-colored), an image coding in the frequency domain is accomplished with a finer quantization and thus a higher image quality.

It should also be noted that it is also possible to perform combinations of the cited options for improving the image quality particularly for the predetermined region that satisfies the criterion.

Although other modifications and changes may be suggested by those skilled in the art, it is the intention of the inventors to embody within the patent warranted hereon all changes and modifications as reasonably and properly come within the scope of their contribution to the art.

I claim:

1. A method for image processing, comprising the steps of:
    a) dividing a digitized image into first and second regions, wherein said first region satisfies a predetermined criterion, and said second region does not satisfy the predetermined criterion;
    b) processing the first region with a higher image quality than the second region;
    c) quantizing the first region using a first quantization value, and quantizing the second region using a second quantization value to achieve the image quality, the first quantization value being less than the second quantization value;
    d) when the criterion is satisfied, guaranteeing an optimally large contiguous region of several blocks that has the predetermined color in that one of the following possibilities is realized:
        1) When a block does not satisfy the predetermined criterion, and said block is largely surrounded by additional blocks that do satisfy the predetermined criterion, said block is also coded with the first quantization value if the result of the comparison operation lies slightly over the predetermined threshold value;
        2) When a block does not satisfy the predetermined criterion, and said block is situated amid blocks that do satisfy the predetermined criterion, then said block is also coded with the first quantization value.

2. A method as claimed in claim 1, further comprising the steps of:
    dividing the image into several regions, and
    processing a number of first regions that satisfy the predetermined criterion with a higher image quality than a number of second regions that do not satisfy the predetermined criterion.

3. A method as claimed in claim 1, wherein the predetermined criterion is that a region of the image has a color from a predetermined color domain.

4. A method as claimed in claim 3, wherein the color approximately corresponds to the color of human skin.

5. A method as claimed in claim 1, further comprising the steps of: processing the image using a block-based image coding method.

6. A method as claimed in claim 5, wherein the block-based image coding method is defined in accordance with an MPEG standard or the H.261 or H.263 standards.

7. A method as claimed in claim 5, further comprising the steps of:
    a) determining the color of the block in the form of second color values of the block for a block of the image of a specific size;
    b) performing a comparison operation of the second color values to the first color values;
    c) satisfying the predetermined criterion when a result of the comparison operation is less than a predetermined threshold value so that the block is at least similar to human skin;
    d) otherwise, the predetermined criterion is not satisfied for said block.

8. A method as claimed in claim 7, further comprising the step of:
    carrying out the method steps for each block of the image iteratively.

9. A method as claimed in claim 7, wherein the predetermined size of the block is eight pixels by eight pixels.

10. A method as claimed in claim 7, wherein the predetermined size of the block is 16 pixels by 16 pixels.

11. A method as claimed in claim 7, wherein the comparison operation is defined by:

$$|x_y - h_y| + |x_{CR} - h_{CR}| + |x_{Cb} - h_{Cb}| < S$$

where $x_y$ references a luminance value of the first color values;

$x_{Cr}$ references a first chrominance value of the first color values;

$x_{Cb}$ references a second chrominance value of the first color values;

$h_y$ references a luminance value of the second color values;

$h_{Cr}$ references a first chrominance value of the second color values;

$h_{Cb}$ references a second chrominance value of the second color values; and

S references the predetermined threshold value.

12. A method as claimed in claim 7, wherein the comparison operation is defined by:

$$|x_y - h_y|^2 + |x_{Cr} - h_{Cr}|^2 + |x_{Cb} - h_{Cb}|^2 < S,$$

where $x_y$ references a luminance value of the first color values;

$x_{Cr}$ references a first chrominance value of the first color values;

$x_{Cb}$ references a second chrominance value of the first color values;

$h_y$ references a luminance value of the second color values;

$h_{Cr}$ references a first chrominance value of the second color values;

$h_{Cb}$ references a second chrominance value of the second color values; and

S references the predetermined threshold value.

13. A method as claimed in claim 7, wherein the comparison operation is defined by:

$$k_1 \cdot |D_1| + k_2 \cdot |D_2| + k_3 \cdot |D_3| < S,$$

where $k_1, k_2, k_3$ reference predeterminable weights;

$D_1$ references a first comparison of the luminance value of the first color values to a luminance value of the second color values;

$D_2$ references a second comparison of a first chrominance value of the first color values to a first chrominance value of the second color values;

$D_3$ references a third comparison of a second chrominance value of the first color values to a second chrominance value of the second color values, and S references the predetermined threshold value.

14. A method as claimed in claim 1, wherein the block-based image coding method is defined in accordance with the MPEG-4 standard, and the predetermined criterion is satisfied for a region that is definable in accordance with the MPEG-4 standard.

15. A method as claimed in claim 1, wherein the higher image quality is achieved in that a higher image repetition rate is specified for the first region.

16. A method as claimed in claim 1, further comprising the step of:

specifying a higher topical resolution for the first region such that a higher number of pixels are processed for the first region.

17. A method as claimed in claim 1, further comprising the step of:

accomplishing the changeover from the first quantization value to the second quantization value in that a DQUANT symbol is transferred with the second quantization value as a parameter, and conversely, accomplishing the changeover from the second quantization value to the first quantization value in that the DQUANT symbol is transferred with the first quantization value as the parameter.

18. An arrangement for image processing, comprising:
a processor unit which is laid out such that
a) a digitized image is divided into two regions, wherein a first region satisfies a predetermined criterion, and a second region does not satisfy the predetermined criterion;
b) the first region is processed with a higher image quality than the second region;
c) the image quality is achieved in that the first region is quantized using a first quantization value, and the second region is quantized using a second quantization value, the first quantization value being less than the second quantization value;
d) in which, when the criterion is satisfied, an optimally large contiguous region comprising several blocks which has the predetermined color is guaranteed in that one of the following possibilities is realized:
1) When a block does not satisfy the criterion, and this block is largely surrounded by additional blocks that do satisfy the criterion, this block is also coded with the first quantization value if the result of the comparison operation lies slightly over the predetermined threshold value;
2) When a block does not satisfy the criterion, and this block is situated amid blocks that do satisfy the criterion, then this block is also coded with the first quantization value.

* * * * *